(12) United States Patent
Baumann et al.

(10) Patent No.: US 11,929,527 B2
(45) Date of Patent: Mar. 12, 2024

(54) FUEL DEVICE AND THE USE THEREOF IN A MOTOR VEHICLE

(71) Applicant: Mahle International GmbH, Stuttgart (DE)

(72) Inventors: Michael Baumann, Ammerbuch (DE); Richard Bruemmer, Stuttgart (DE); Matthias Gaenswein, Esslingen (DE); Sven Alexander Kaiser, Waiblingen (DE); Frank Von Luetzau, Winnenden (DE); Jan Schultes, Stuttgart (DE); Thomas Strauss, Notzingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 17/869,787

(22) Filed: Jul. 20, 2022

(65) Prior Publication Data

US 2023/0026964 A1 Jan. 26, 2023

(30) Foreign Application Priority Data

Jul. 21, 2021 (DE) .......................... 102021207794.3

(51) Int. Cl.
H01M 8/04119 (2016.01)
B01D 53/26 (2006.01)
(Continued)

(52) U.S. Cl.
CPC ........ *H01M 8/04164* (2013.01); *B01D 53/26* (2013.01); *F28F 25/02* (2013.01);
(Continued)

(58) Field of Classification Search
CPC ......... H01M 8/04164; H01M 8/04074; H01M 8/04111; H01M 8/04126; H01M 8/04723; H01M 8/04029; H01M 8/04059; H01M 8/04141; H01M 8/04156; H01M 8/04171; H01M 8/04179; H01M 8/04507;
(Continued)

(56) References Cited

FOREIGN PATENT DOCUMENTS

DE 102009014743 A1 9/2010
DE 102017002741 * 9/2018
(Continued)

OTHER PUBLICATIONS

English abstract for KR-10 2017 0 059 515.
(Continued)

*Primary Examiner* — Matthew W Van Oudenaren
(74) *Attorney, Agent, or Firm* — Fishman Stewart PLLC

(57) ABSTRACT

A fuel cell device of a motor vehicle is disclosed. The fuel cell device includes a fuel cell, a supply air path leading to the fuel cell for a cathode supply air flow, and an exhaust air path leading away from the fuel cell for a cathode exhaust air flow. The supply air path and the exhaust air path are routed through a humidifier that humidifies the supply air and dehumidifies the exhaust air. The exhaust air path is further routed through a water separator that removes water from the exhaust air to provide evaporation water. A heat exchanger for cooling the fuel cell is provided that has an evaporative cooler for cooling the heat exchanger. The evaporative cooler is assigned to the water separator in fluidic communication and is supplied with evaporation water by the water separator.

20 Claims, 7 Drawing Sheets

(51) Int. Cl.
*F28F 25/02* (2006.01)
*H01M 8/04007* (2016.01)
*H01M 8/04111* (2016.01)
*H01M 8/04701* (2016.01)

(52) U.S. Cl.
CPC .... *H01M 8/04074* (2013.01); *H01M 8/04111* (2013.01); *H01M 8/04126* (2013.01); *H01M 8/04723* (2013.01); *H01M 2250/20* (2013.01)

(58) Field of Classification Search
CPC ......... H01M 8/04522; H01M 8/04835; H01M 8/04843; H01M 2250/20; F28F 25/02; F28D 2021/0043
See application file for complete search history.

(56) References Cited

FOREIGN PATENT DOCUMENTS

DE   102017002741 A1   9/2018
KR   1020170059515   *   5/2017

OTHER PUBLICATIONS

English abstract for DE-102017002741.
English abstract for DE-10 2009 014 743.
German Search Report for DE-102021207794.3, dated Mar. 23, 2022.

* cited by examiner

FUEL DEVICE AND THE USE THEREOF IN A MOTOR VEHICLE

CROSS-REFERENCE TO RELATED APPLICATION

This application claims priority to German Application No. DE 10 2021 207 794.3 filed on Jul. 21, 2021, the contents of which are hereby incorporated by reference in its entirety.

TECHNICAL FIELD

The invention relates to a fuel cell device and the use thereof in a motor vehicle.

BACKGROUND

Fuel cell devices of the type mentioned have been known for a long time. The disadvantage with these devices is that they have to be cooled during operation.

The object of the invention is to specify an improved or at least different embodiment of a fuel cell device. In particular, the cooling of the fuel cell device should be improved or simplified.

In the present invention, the object is achieved particularly by means of the subject matters of the independent claims. Advantageous embodiments are the subject matter of the dependent claims and the description.

SUMMARY

The basic idea of the invention is to assign a heat exchanger for cooling to a fuel cell of a fuel cell device, wherein the heat exchanger has an evaporative cooler for cooling the heat exchanger, which is supplied by means of evaporation water provided from the cathode exhaust air flow of the fuel cell.

For this purpose, a fuel cell device is provided, in particular for a motor vehicle, which fuel cell device has a fuel cell which, during operation, emits water as a product of cold combustion; a supply air path leading to the fuel cell for a cathode supply air flow, which defines a supply air flow direction, the cathode supply air flow coming from water-containing supply air supplied to the fuel cell; and an exhaust air pathleading away from the fuel cell, for a cathode exhaust air flow, which defines an exhaust air flow direction, the cathode exhaust air flow coming from water-containing exhaust air flowing out of the fuel cell. The supply air in this case can be realized or obtained from the cathode exhaust air or ambient air of the fuel cell device and conveyed, for example by means of a compressor system, which is described in more detail below, along the supply air path to the fuel cell. The exhaust air can be subject to overpressure relative to the ambient air of the fuel cell device, for example 0.8 to 1.5 bar or 1.8 bar to 2.5 bar or 1.5 bar to 3.0 bar absolute pressure. As a result, the exhaust air automatically flows out of the fuel cell. Furthermore, it is provided that the supply air path and the exhaust air path are routed through a humidifier of the fuel cell device, which humidifier communicates fluidically with the supply air and the exhaust air, for humidifying the supply air and dehumidifying the exhaust air, wherein the exhaust air path is further routed through a water separator of the fuel cell device, which water separator communicates fluidically with the exhaust air, and which also could be designated as a water extraction device, for removing water from the exhaust air and for providing this water as evaporation water. The water separator can be implemented, for example, by a preliminary water separator, a fine water separator, an exhaust air condenser, a water outlet on or after an expansion turbine of the exhaust air path of the fuel cell, or by any combination of these components. The fuel cell device further includes a heat exchanger for cooling the fuel cell. The heat exchanger has an evaporative cooler, which is used to cool the heat exchanger. The evaporative cooler is assigned to the water separator in fluidic communication and is supplied or at least can be supplied with evaporation water by same. As a result, the water entrained in the exhaust air from the fuel cell is not a by-product of the cold combustion in the fuel cell that requires expensive disposal, but can be reused directly for cooling same. For example, this eliminates the need for providing external water for cooling. Consequently, the fuel cell device is improved or at least simplified.

Said evaporative cooler can expediently form an evaporative cooler device which has a coolant cooler and, upstream of the coolant cooler, a sprinkler unit and/or a nebulization unit, for example a rotary nebulizer.

It is also expedient if the water separator is arranged upstream of the humidifier with respect to the exhaust air flow direction of the cathode exhaust air flow. Alternatively or additionally, the water separator can be arranged downstream of the humidifier with respect to the exhaust air flow direction of the cathode exhaust air flow. Furthermore, additionally or alternatively, said water separator can be arranged in or downstream of an expansion turbine or can be formed by same. Exhaust air can flow through the expansion turbine, which can be inserted into the cathode exhaust air flow in fluidic communication, downstream of the humidifier and/or downstream of an evaporation water tank, which will be explained later. In particular, the expansion turbine can fluidically connect a drive turbine, to be explained later, to the evaporation water tank, to be explained later. If waste heat from the fuel cell is used, a relatively large water quantity can accumulate in the expansion turbine, but this has little or no overpressure with respect to the standard atmosphere, particularly if it is obtained only at the outlet of the turbine or thereafter. In this context, it can also be provided that the water separator, which is arranged upstream of the humidifier, is formed by a coarse water separator for removing water from the exhaust air and for providing this water as evaporation water. The coarse water separator in this case is arranged upstream of the humidifier with respect to the exhaust air flow direction of the cathode exhaust air flow and is connected fluidically upstream of the humidifier. It can remove relatively large water droplets from the exhaust air. As a result, it can advantageously remove a relatively large water quantity or a relatively large water volume from the exhaust air and obtain and provide it as evaporation water for supplying the evaporative cooler. In addition, the coarse water separator has the advantage that the humidifier can be protected from moisture damage that can be caused by excessive water ingress with the exhaust air. Additionally or alternatively, it can be provided that the water separator, which is arranged downstream of the humidifier, is formed by a fine water separator for removing water from the exhaust air and for providing this water as evaporation water. The fine water separator in this case is arranged downstream of the humidifier with respect to the exhaust air flow direction of the cathode exhaust air flow and is connected fluidically downstream of the humidifier. It can remove relatively small water particles from the exhaust air. As a result, it can advantageously remove a water quantity or water volume from the exhaust air flowing out of the humidifier and obtain and provide it as evaporation water for supplying the evaporative cooler. The fine water separator offers the further advantage that it removes residual moisture from the exhaust air flowing out of the humidifier, whereby components of the fuel cell device, which are arranged further downstream in the cathode exhaust air flow, in particular a compressor system, in particular an exhaust air turbine of an air supply device, can be protected from moisture damage, in particular droplet impact. In this case, provision can be made for the fine water separator to be equipped with a water outlet or a water outlet valve through which evaporation water provided by the fine water separator can flow into the environment of the fuel cell device or can be used in some other way in the fuel cell device. Furthermore, the water from an exhaust air turbine of an air supply device can be used for evaporative cooling if liquid water is available there.

The water separator can expediently be formed both by a coarse water separator and a fine water separator. As a result, on the one hand, a relatively large proportion of water can be removed from the exhaust air of the cathode exhaust air flow. On the other hand, a relatively large water quantity or a relatively large water volume can be obtained and made available as evaporation water for supplying the evaporative cooler.

Expediently, the evaporation water provided can be pressurized by exhaust air from the cathode exhaust air flow. The exhaust air from the fuel cell, which is under overpressure, e.g. 1.8 bar to 2.5 bar or 1.5 bar to 3.0 bar absolute pressure, causes the evaporation water separated from the exhaust air by means of the water separator to be conveyed into the evaporative cooler. As a result, the heat exchanger or the evaporative cooler can be implemented without a conveying device for the evaporation water, as a result of which a corresponding fuel cell device can be produced relatively inexpensively.

It is also expedient if the fuel cell device has a feed water path leading from the water separator to the evaporative cooler for a feed water flow of evaporation water, which feed water flow defines a feed flow direction, in order to supply the evaporative cooler. As a result, the evaporative cooler is connected to the water separator in fluidic communication so that evaporation water from the exhaust air, which evaporation water is provided by the water separator, can flow from the water separator to the evaporative cooler. The feed water path, for example, can lead through an evaporation water line of the fuel cell device that fluidically connects the water separator to the evaporative cooler. Alternatively, it can be provided that the fuel cell device has a pair of fluidically parallel feed water paths for supplying the evaporative cooler, namely a feed water path for a feed water flow of evaporation water, which feed water flow defines a feed flow direction and which leads from the coarse water separator to the evaporative cooler, and a further feed water path for a further feed water flow of evaporation water, which further feed water flow defines a further feed flow direction and which leads from the fine water separator to the evaporative cooler. As a result, evaporation water from the exhaust air, which evaporation water is provided by the coarse water separator and fine water separator, can flow to the evaporative cooler, thereby supplying the evaporative cooler. This means that the evaporative cooler is connected to the coarse water separator and the fine water separator in fluidic communication, so that evaporation water provided from the exhaust air can flow from the coarse water separator and fine water separator to the evaporative cooler. The feed water path and the further feed water path, for example, can each be routed through an evaporation water line fluidically connecting the coarse water separator or the fine water separator to the evaporative cooler.

Furthermore, the fuel cell device can have a valve device for controlling or regulating a mass or volumetric flow of the evaporation water, which valve device allows evaporation water to flow through, and which valve device is fluidically inserted into the feed water flow or into the further feed water flow or into the one feed water flow and the further feed water flow, between the evaporative cooler and the water separator. As a result, the feed water path for said feed water flow leads through a valve device. This allows the feed water flow to be controlled or regulated, for example with regard to the quantity of evaporation water flowing through or the volume of evaporation water flowing through. Advantageously, the cooling capacity of the evaporative cooler can be controlled or regulated as a result.

Furthermore, at least two valve devices can be provided for controlling or regulating a mass or volumetric flow of the evaporation water, wherein the one valve device allows evaporation water to flow through and is fluidically inserted into the feed water flow between the evaporative cooler and the coarse water separator, and wherein the further valve device allows evaporation water to flow through and is fluidically inserted into the further feed water flow between the evaporative cooler and the fine water separator. Advantageously, the cooling capacity of the evaporative cooler can also hereby be controlled or regulated.

It is also expedient if the one valve device is implemented by means of a water feed valve, a float valve, a float valve with leakage, a pressure relief valve, a non-return valve, or by a combination of these valves.

Furthermore, said further valve device can be implemented by means of a water feed valve with or without leakage, a float valve with or without leakage, a pressure relief valve, a non-return valve, or by a combination of these valves. A water feed valve represents a cost-effective way of implementing a valve device. A float valve can advantageously prevent the outflow of exhaust air into the evaporative cooling system, i.e. the area guiding the evaporation water and being downstream of the water separator, if there is no or practically almost no water or evaporation water available at the water separator. An intentional leak in the water feed valve or the float valve or even a brief opening of the valve allows exhaust air from the fuel cell exhaust air system to flow through the evaporative cooling system in a targeted manner in order to release evaporation water from the entire system or at least the evaporative cooler. In practice, this can also be referred to as "blowing out." This has the advantage that the entire system, or at least the evaporative cooler, cannot freeze if the ambient temperatures drop accordingly. It is then not necessary to empty the system. A pressure relief valve protects the heat exchanger or evaporative cooler from pressures in the cathode exhaust air flow which increase to above a determined or determinable limit pressure permissible for the heat exchanger or evaporative cooler. This can prevent damage to the heat exchanger and/or the evaporative cooler due to excess pressure. A non-return valve can protect the cathode exhaust air flow and the components that communicate fluidically therewith in the event that an overpressure measured relative to the pressure in the cathode exhaust air flow occurs in the heat exchanger or in the evaporative cooler, particularly in an evaporation water tank of the heat exchanger or the evaporative cooler, which overpressure exceeds a limit pressure defined or definable for the cathode exhaust air flow and which is permissible with these fluidically communicating components. This can prevent the cathode exhaust air flow from being pressurized and damaging the components that communicate fluidically therewith. It is also conceivable that the valve device also functions as an air valve and, in addition to evaporation water, also allows exhaust air and/or supply air to pass through.

Further expediently, the fuel cell device can have a collection volume for collecting evaporation water. The collection volume can be fluidically connected to the evaporative cooler, on the one side, and to the water separator or the coarse water separator and/or the fine water separator, on the other side.

It is also expedient if said collection volume is formed or delimited by at least one evaporation water line for a feed water flow of evaporation water. In addition to this at least one evaporation water line, the collection volume can also be formed or delimited by at least one further evaporation water line for the further feed water flow of evaporation water. For example, the collection volume can be formed or delimited by a single evaporation water line, which expediently fluidically connects the water separator or coarse water separator to the evaporative cooler. Alternatively, the collection volume can be formed or delimited by two or more evaporation water lines which, for example, fluidically connect the coarse water separator to the evaporative cooler and the fine water separator to the evaporative cooler. As a result, an advantageous, relatively inexpensive and relatively compact design of the collection volume is provided overall.

Furthermore, the fuel cell device can have a separate evaporation water tank for collecting evaporation water. This tank can supplement or form or delimit the collection volume. The evaporation water tank allows evaporation water to expediently flow through and is then fluidically inserted into the feed water flow between the coarse water separator and the evaporative cooler. Alternatively, the fuel cell device can have a separate evaporation water tank for collecting evaporation water, which tank supplements or forms or delimits the collection volume and allows evaporation water to flow through, and the tank is inserted into the feed water flow fluidically between the valve device and the evaporative cooler. Furthermore, an embodiment of the fuel cell device is conceivable in which evaporation water tanks are arranged both upstream and downstream of the valve device. It is possible to store evaporation water with the evaporation water tank. As a result, the supply of evaporation water to the evaporative cooler becomes less sensitive to fluctuations in the quantity or volume of evaporation water provided by the coarse water separator, which can be attributed to different operating states of the fuel cell, for example. A valve device upstream of the evaporation water tank with respect to the feed flow direction makes it possible to control the quantity or volume of evaporation water flowing into the evaporation water tank.

It is also expedient if the evaporation water tank has a tank collection volume of greater than 0 liters/kW and less than or equal to 0.1 liters/kW of installed electrical output of the fuel cell. For example, the tank collection volume can be 30 liters and the electrical output of the fuel cell can be 300 kW. One skilled in the art will expediently read the expression "liter/kW" as "liters per kilowatt."

Furthermore, the evaporation water tank can be pressurized by means of pressurized supply air from the cathode supply air flow and/or by means of pressurized exhaust air from the cathode exhaust air flow. As a result, the evaporation water tank can be subjected to an overpressure of the exhaust air or the supply air of, for example, 1.8 bar to 2.5 bar or 2.8 bar to 3.5 bar absolute pressure, measured with respect to the environment of the fuel cell device. Alternatively, the overpressure can lie between the pressure in the evaporative cooler or the ambient pressure of the fuel cell device and the pressure in the cathode exhaust air flow. The exhaust air can expediently be tapped from the cathode exhaust air flow upstream of the coarse water separator or downstream of the humidifier or downstream of the fine water separator. The supply air can expediently be tapped from the cathode supply air flow upstream of the fuel cell. In both cases, the tapped compressed air can flow to the evaporation water tank through its own compressed air line, into which a controllable or adjustable air valve can be installed. The evaporation water tank pressurized in this way has the advantage that evaporation water collected in the evaporation water tank automatically flows out of the evaporation water tank to the evaporative cooler. This has the advantage that a separate conveying device can be dispensed with. In principle, the evaporation water tank can, of course, be kept pressure-free with respect to the environment of the fuel cell device, particularly when using a delivery pump, to be described later.

It is also expedient if an air valve is provided for pressurizing the evaporation water tank, which air valve connects the cathode supply air flow to the evaporation water tank in fluidic communication, so that supply air can flow through the air valve into the evaporation water tank and pressurize it. As a result, for example, a separate conveying device for conveying the evaporation water from the evaporation water tank into the evaporative cooler can be dispensed with. It is conceivable that the air valve is implemented by a 4/3-way valve with a shut-off function.

Further expediently, the fuel cell device can have a feed valve device for controlling or regulating a mass or volumetric flow of the evaporation water, which feed valve device allows evaporation water to flow through and is fluidically inserted into the one feed water flow, between the evaporative cooler and the evaporation water tank. The purpose of the feed valve device downstream of the evaporation water tank in the feed flow direction is to control or regulate the mass or volumetric flow of the evaporation water flowing out of the evaporation water tank. For this purpose, it can be provided that the feed valve device is implemented by a sprinkler valve. A sprinkler valve is intended to control and/or regulate the sprinkling or evaporation water mass flow of evaporation water or process water for evaporative cooling. This valve can be designed as a proportional valve in order to continuously control or regulate the evaporation water mass flow. Alternatively, an on/off valve is also conceivable. In this case, the evaporation water mass flow can be varied by throttling the line, by changing the pressure in the evaporation water tank, or by means of a variable conveying device, such as a pump.

It is also expedient if the feed valve device has or is formed by a sprinkler valve for controlling or regulating the mass or volumetric flow of the evaporation water flowing out of the evaporation water tank. Alternatively or additionally, the feed valve device can have or be formed by a conveying device for conveying evaporation water from the evaporation water tank to the evaporative cooler. Further alternatively or additionally, the feed valve device can have or be formed by a water outlet valve for draining evaporation water from the evaporation water tank, wherein the water outlet valve is arranged either fluidically directly on the evaporation water tank or fluidically indirectly via the conveying device or a sprinkler valve on the evaporation water tank. This allows the mass or volumetric flow of evaporation water flowing to the evaporation water tank to be controlled. Furthermore, evaporation water can be discharged by means of the water outlet valve, for example towards the environment of the fuel cell device. This can be useful, for example, when the fuel cell device is switched off, or when the evaporation water tank overflows, or as protection against freezing at temperatures around 0° C. The conveying device allows evaporation water to be conveyed to the evaporation water tank with a predetermined mass or volumetric flow.

Furthermore, the conveying device can be implemented by means of a delivery pump, particularly a peripheral wheel pump or a side channel impeller. The peripheral wheel pump or the side channel impeller preferably works at relatively small volumetric flows and relatively high absolute pressures.

It is also expedient if the fuel cell device has a compressor system which has a compressor that is or can be operated by exhaust air. The impeller thereof for compressing supply air allows the supply air to flow through and is fluidically inserted into the cathode supply air flow upstream of the fuel cell, wherein the drive turbine thereof for driving the impeller allows exhaust air to flow through and is fluidically inserted into the cathode exhaust air flow downstream of the humidifier or the fine water separator. It is conceivable that the compressor system has a cooler for cooling supply air compressed by the impeller, wherein this cooler is arranged on the impeller downstream of the impeller with respect to the cathode supply air flow so that compressed supply air can flow through.

Furthermore, the following can be provided or implemented:

the heat exchanger or the evaporative cooler is operated or used at an ambient temperature of the fuel cell device of greater than or equal to 5° C. or an ambient temperature significantly above freezing point; or the heat exchanger or evaporative cooling is also used in sub-freezing temperatures to "get rid" of the water without dripping it onto the cold street, wherein heating of the evaporation water tank and the rest of the equipment, i.e. the fuel cell device, e.g. by means of coolant, can be useful;

the heat exchanger or the evaporative cooler is operated at a coolant temperature from the fuel cell of greater than or equal to 60° C. or greater than or equal to 70° C. or greater than or equal to 75° C. or a coolant temperature in a range between 60° C. and 90° C.; or the operation of the heat exchanger or the evaporative cooler is controlled or regulated by means of a switch-on characteristic, wherein the degree of switch-on $z_{Verd}$ is based on the quantity of heat $Q_{FC}$ of the fuel cell and the ambient temperature $T_{Amb}$ in ° C. of the fuel cell device approximately according to the following equation:

$$ZVerd \approx f(Q_{FC}/Q \max * 55° C./(75° C.-TAmb))$$

where the character "*" is understood to be a multiplication sign and where $f(x)=0$ for $x<0.5$; or the operation of the heat exchanger or the evaporative cooler is regulated, wherein the regulation takes place via a demand map with or without taking into account the thermal inertia of the fuel cell device; or the operation of the heat exchanger or the evaporative cooler is regulated, wherein the regulation takes place based on the ambient temperature of the fuel cell device or the ambient temperature of the fuel cell device and humidity or a coolant temperature; or the operation of the heat exchanger or the evaporative cooler is regulated, wherein the regulation is controlled by a thermostatic valve and/or supported by the activation of a fan;

or the operation of the heat exchanger or the evaporative cooler is regulated, wherein one or all of the following variables are included in the regulation: level of water in the reservoir, use of a retarder, air conditioning, state of charge and temperature of the battery, driving speed, total weight, terrain topology, and traffic situation.

Furthermore, it is conceivable that the supply of the evaporative cooler is regulated with evaporation water; or the evaporative cooler is supplied with evaporation water as needed, wherein a fuel cell load reflecting the operating state of the fuel cell is proportional to the water quantity removed from the exhaust air by the water separator in order to implement needs-based cooling during a relatively high fuel cell load; or the evaporative cooler is supplied with a water quantity of 2.5 to 20 g/s per fuel cell stack, or 5.0 to 15 g/s per fuel cell stack, or on average between 0.025 and 0.2 $g/kJ_{el}$, or on average between 0.005 and 0.15 $g/kJ_{el}$; or the evaporative cooler is supplied with a water quantity that depends on the electrical work of the fuel cell, wherein this water quantity is on average between 0.005 and 0.16 g/kJ; or the evaporative cooler is only supplied with evaporation water when an evaporation water tank fluidically upstream of the evaporative cooler, which tank is used to collect evaporation water for supplying the evaporative cooler, is full, wherein the amount of evaporation water supplied to the evaporative cooler is adjusted in such a way that the evaporation water volume stored in the evaporation water tank remains constant. As a result, only the amount of evaporation water needed for the evaporative cooler is collected, so that continuous operation of the heat exchanger is ensured. It is conceivable that, if the cooling capacity limit will possibly be reached, i.e. if the coolant temperature of the fuel cell cannot be maintained, the amount of evaporation water supplied to the evaporative cooler will increase until the coolant limit temperature is reached again or slightly undershot.

It is also expedient if the evaporation water tank is filled to a certain minimum level, which can depend primarily on the ambient temperature and the absolute tank size. Another important criterion applies when the evaporation water tank is also used by the humidifier, wherein a certain quantity of evaporation water must always be available at least for humidification before the evaporative cooling is activated. In addition, the minimum amount can also depend on the driving route or a theoretical minimum operating time at maximum water mass flow.

In order to achieve the above-mentioned object, a use of the fuel cell device according to the preceding description is also expediently provided in a motor vehicle. In this case, the fuel cell device can be integrated or retrofitted directly into the motor vehicle. It can also be operated according to the operating parameters mentioned above.

In order to achieve the above-mentioned object, a method for operating the fuel cell device according to the above description is also expediently provided, having the following operating steps:

starting the fuel cell, wherein water is removed from the exhaust air by means of a water separator, collected, and made available as evaporation water;

activating the evaporative cooler of the heat exchanger of the fuel cell device if a collection volume of the fuel cell device for the evaporation water provided is full or practically full;

adjusting the water quantity or the water volume of the evaporation water supplied to the evaporative cooler so that the water quantity or water volume of evaporation water stored in the collection volume remains the same or practically the same, particularly so that only the amount of evaporation water needed for the evaporative cooler is collected by the water separator;

increasing the water quantity or water volume of evaporation water supplied to the evaporative cooler to increase the cooling capacity of the evaporative cooler if the cooling capacity limit of the heat exchanger is reached and/or the coolant temperatures of the heat exchanger are not maintained.

In all of the exemplary embodiments, the evaporation water tank can also be referred to as a water tank, or vice versa. In all of the exemplary embodiments, evaporation water can also be referred to as cooling water or water, or vice versa.

In summary, the following can be stated: The present invention preferably relates to a fuel cell device having a fuel cell which, during operation, emits water as a product of cold combustion; a supply air path leading to the fuel cell for a cathode supply air flow, which defines a supply air flow direction, the cathode supply air flow coming from supply air supplied to the fuel cell; and an exhaust air path leading away from the fuel cell, for a cathode exhaust air flow, which defines an exhaust air flow direction, the cathode exhaust air flow coming from water-containing exhaust air flowing out of the fuel cell. The supply air path and the exhaust air path are routed through a humidifier of the fuel cell device, which humidifier communicates fluidically with the supply air and the exhaust air, for humidifying the supply air and dehumidifying the exhaust air. The exhaust air path is also routed through a water separator of the fuel cell device, which water separator communicates fluidically with the exhaust air, for removing water from the exhaust air and for providing this water as evaporation water. The fuel cell device also has a heat exchanger for cooling the fuel cell, which heat exchanger has an evaporative cooler for cooling the heat exchanger. It is essential that the evaporative cooler is assigned to the water separator in fluidic communication and that it is supplied with evaporation water by same.

Further important features and advantages of the invention result from the dependent claims, from the drawings, and from the associated description of the figures with reference to the drawings.

It is understood that the features mentioned above and those to be explained below may be used not only in the combination indicated in each case, but also in other combinations or in isolation, without deviating from the scope of the present invention.

Preferred exemplary embodiments of the invention are shown in the drawings and will be explained in more detail in the description below, wherein identical reference numerals denote identical or similar or functionally identical components.

BRIEF DESCRIPTION OF THE DRAWINGS

The following is shown.

DETAILED DESCRIPTION

Figure 1:
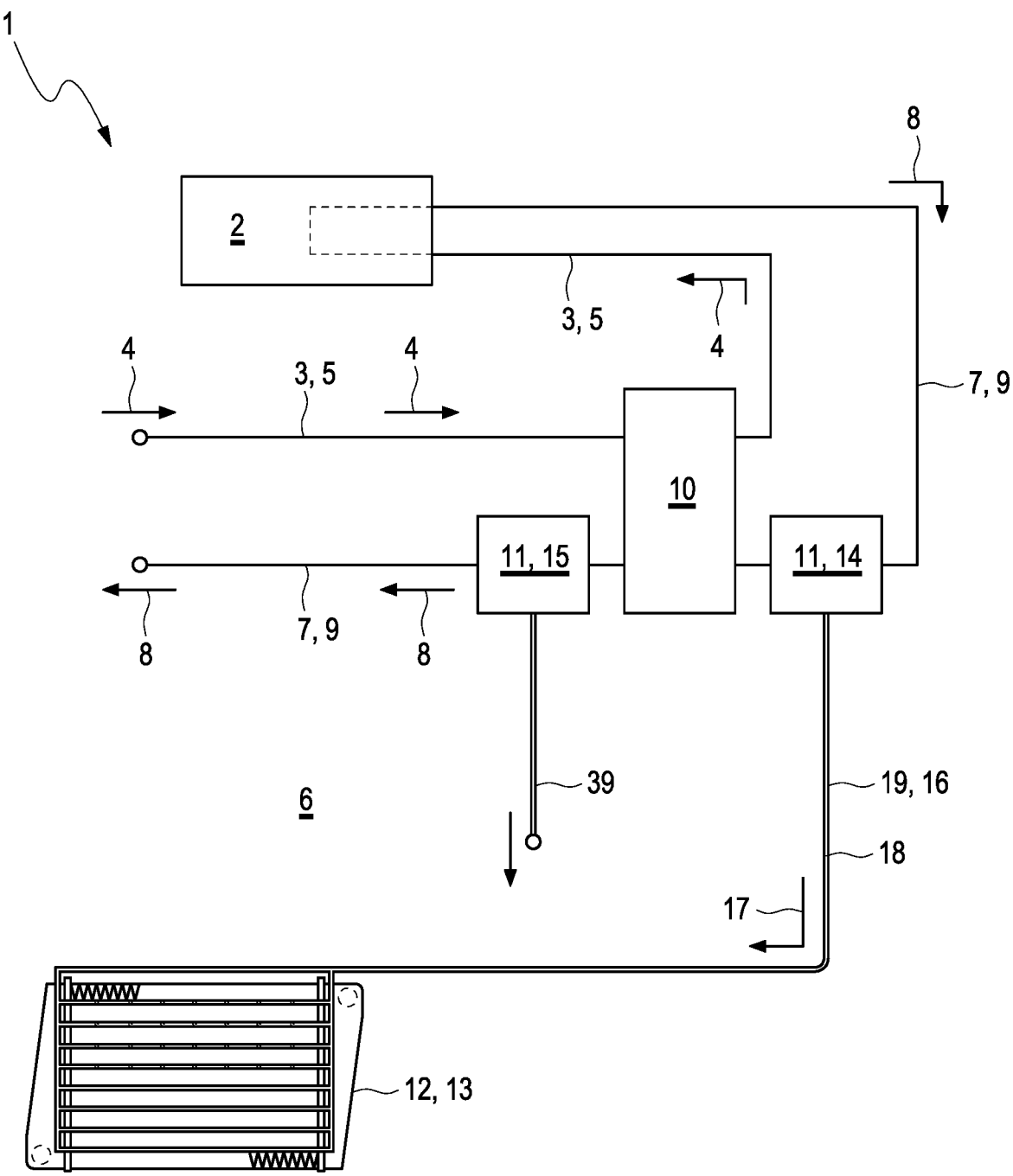
FIGS. 1 to 7 each schematically show a simplified diagram of a preferred exemplary embodiment of a fuel cell device.

FIGS. 1 to 7 show preferred exemplary embodiments of a fuel cell device denoted overall by the reference numeral 1. They can all be integrated or retrofitted into a motor vehicle.

FIG. 1 shows a simplified diagram of a preferred exemplary embodiment of a fuel cell device 1. The fuel cell device 1 has a fuel cell 2, which is indicated by a small box. A supply air path 3 for a cathode supply air flow 5, which defines a supply air flow direction 4, leads to the fuel cell 2, the cathode supply air coming from supply air which is supplied to the fuel cell 2 and contains water. The fuel cell device 1 also has an exhaust air path 7 leading away from the fuel cell 2, for a cathode exhaust air flow 9, which defines an exhaust air flow direction 8, the cathode exhaust air coming from water-containing exhaust air flowing from the fuel cell 2. Depending on the operation, the exhaust air flowing out of the fuel cell is under an absolute pressure of, for example, 0.8 to 1.5 bar or 1.8 bar to 2.5 bar or 1.5 bar to 3.0 bar. The supply air path 3 and the exhaust air path 7 are each routed through a humidifier 10 of the fuel cell device 1, which humidifier communicates fluidically with the supply air and the exhaust air and is also indicated by a small box and used for humidifying the supply air and dehumidifying the exhaust air. The exhaust air path 7 is also routed through a multi-part water separator 11 of the fuel cell device 1, which water separator communicates fluidically with the exhaust air, for removing water from the exhaust air and for providing this water as evaporation water. One part of the multi-part water separator 11, which is arranged upstream of the humidifier 10 with respect to the cathode exhaust air flow 9, is formed by a coarse water separator 14 for removing water from the exhaust air and for providing this water as evaporation water. The coarse water separator 14 can remove relatively large water droplets from the exhaust air, as a result of which a relatively large water quantity or a relatively large water volume can advantageously be obtained and made available. The other part of the multi-part water separator 11, which is arranged downstream of the humidifier 10, is formed, for example, by a fine water separator 15 for removing water from the exhaust air flowing out of the humidifier 10 and for providing this water as evaporation water. The fine water separator 15 can remove relatively small water particles and/or residual moisture from the exhaust air. As a result, it can advantageously remove at least a relatively small water quantity or a relatively small water volume from the exhaust air flowing out of the humidifier 10 and provide it as evaporation water. The fine water separator 15 offers the further advantage that the exhaust air is dehumidified in such a way that components of the fuel cell device 1 arranged further downstream in the cathode exhaust air flow 9, in particular a compressor system 34 to be explained below, are protected from moisture damage, in particular droplet impact. In the present case, the fine water separator 15 is equipped with a water outlet 39, which allows collected waste water/evaporation water to be discharged into the environment 6 of the fuel cell device 1, which is indicated purely symbolically in FIG. 1 by an arrow.

FIG. 1 also shows a heat exchanger 12, which is used to cool the fuel cell 2 and has an evaporative cooler 13, which is provided for cooling the heat exchanger 12. The evaporative cooler 13, for example, is assigned to the coarse water separator 14 in fluidic communication and supplied with evaporation water by same. The evaporation water flows, for example, through an evaporation water line 19 fluidically connecting the evaporative cooler 13 to the coarse water separator 14, with a feed water path 16 for a feed water flow 18 of evaporation water, which feed water flow defines a feed flow direction 17, leading through the evaporation water line. According to the invention, it is thereby possible for removing water from the cathode exhaust air flow 9 by means of the coarse water separator 14 during operation of the fuel cell device 1 and to use it as evaporation water for the evaporative cooler 13. Expediently, during operation of the fuel cell device 1, a sufficient water quantity or a sufficient water volume can be provided as evaporation water at the coarse water separator 14, so that the evaporative cooler 13 can be optimally supplied, whereby it can generate a predetermined or predeterminable cooling capacity. This has the advantage that external evaporation water sources can be dispensed with, which simplifies the fuel cell device 1.

Figure 2:
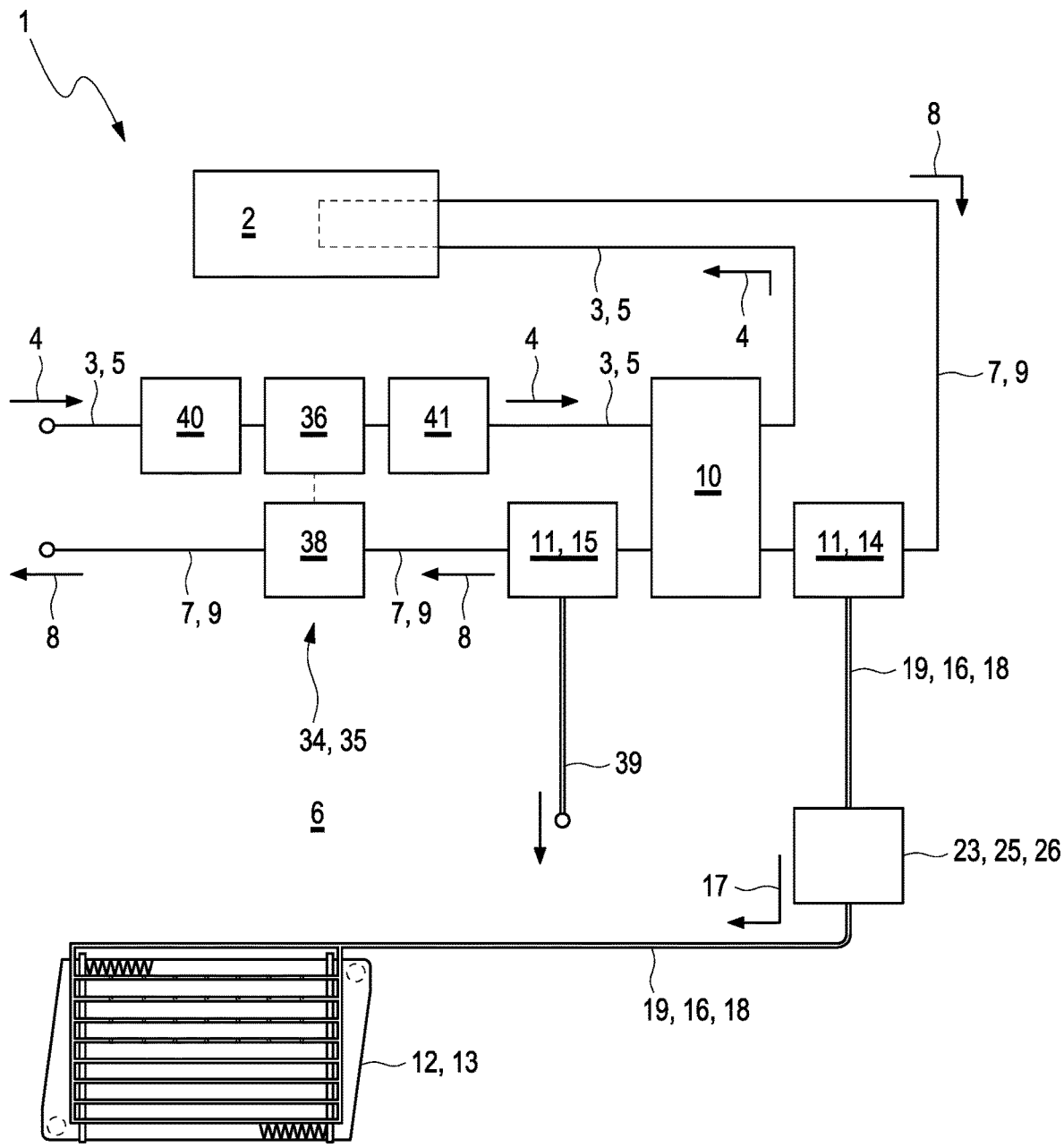

FIG. 2 shows a simplified diagram of a preferred, further exemplary embodiment of a fuel cell device 1. It differs from the previous exemplary embodiment in particular due to a compressor system labeled with the reference numeral 34 and a valve device 23. The compressor system 34, for example, has a compressor 35, which has a drive turbine 38 that is or can be operated with exhaust air and an impeller 36 for compressing supply air. The impeller 36 allows supply air to flow through it and is inserted into the cathode supply air flow 5 upstream of the fuel cell 2 and the humidifier 10 in relation to the supply air flow direction 4. An air filter 40 of the compressor system 34 is arranged upstream of the impeller 36 in the supply air flow direction 4 to filter the supply air flowing into the impeller 36, and a charge air cooler 41 of the compressor system 34 is arranged downstream of the impeller 36 for cooling compressed supply air. The drive turbine 38 of the compressor 35 allows exhaust air to flow through and is inserted into the cathode exhaust air flow 9, in the exhaust air flow direction 8, downstream of the fine water separator 15. This drive turbine transmits kinetic energy from the exhaust air to the impeller 36, which then transmits it to the supply air. The aforementioned valve device 23 is used to control or regulate a mass or volumetric flow of the feed water flow 18 of evaporation water, which feed water flow flows through the evaporation water line 19. The valve device is implemented, for example, by a water feed valve 25 or a float valve 26 and allows evaporation water to flow through and is fluidically inserted into the feed water flow 18, between the evaporative cooler 13 and the coarse water separator 14, so that the mass or volumetric flow of evaporation water flowing into the evaporative cooler 13 can be conveniently controlled or regulated.

Figure 3:
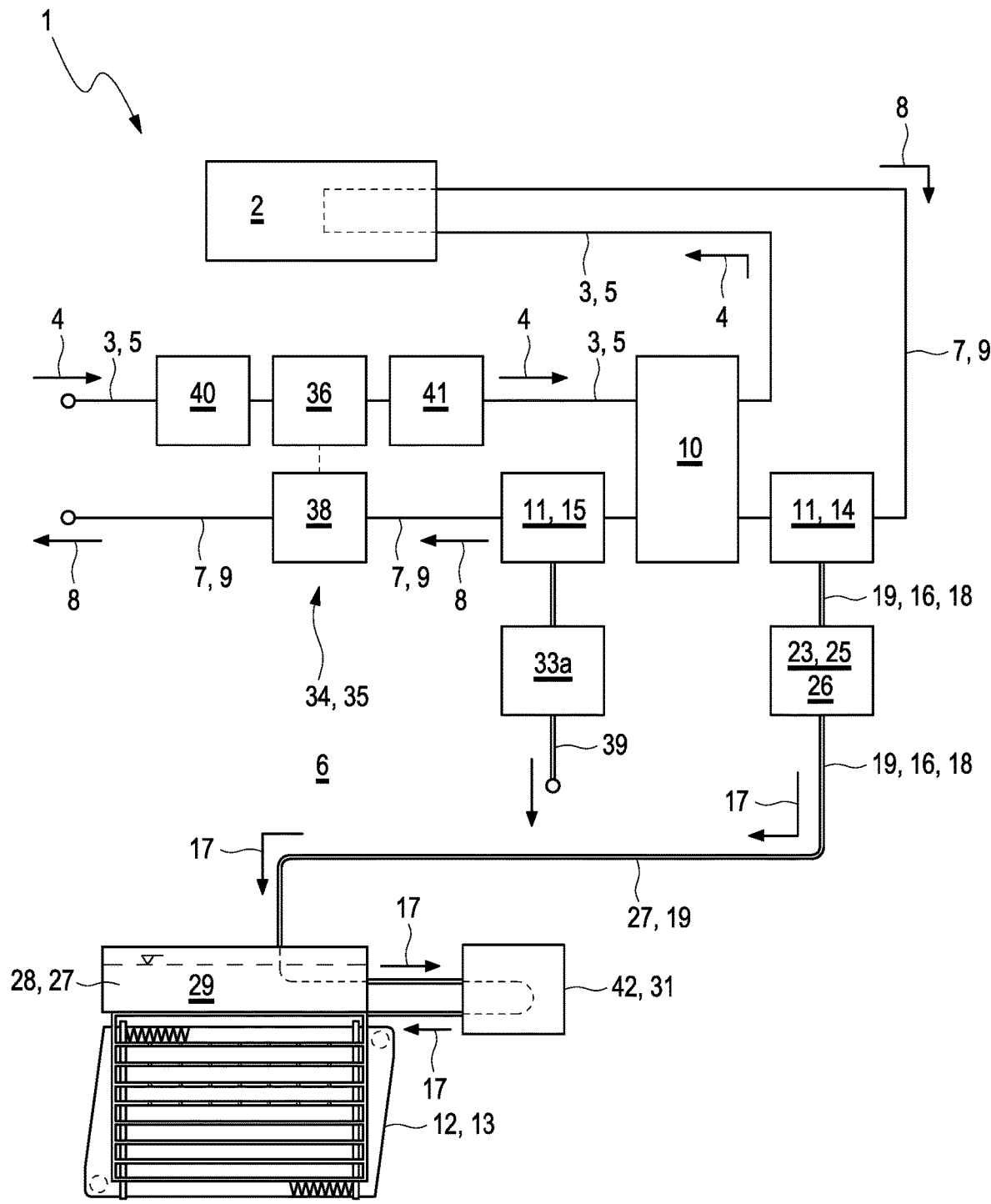

FIG. 3 shows a simplified diagram of a preferred, further exemplary embodiment of a fuel cell device 1. It differs from the previous exemplary embodiments in particular in that the fine water separator 15 is connected to the water outlet 39, in fluidic communication, via a water outlet valve 33a, so that the discharge of waste water/evaporation water from the fine water separator 15 to the environment 6 of the fuel cell device 1 can be controlled or regulated. Furthermore, FIG. 3 shows a collection volume, denoted by the reference numeral 27, for collecting evaporation water. The collection volume 27 is fluidically connected to the evaporative cooler 13 on one side and to the coarse water separator 14 on the other, so that evaporation water can flow from the coarse water separator 14 to the evaporative cooler 13. In the present case, the collection volume 27 is formed or delimited both by the evaporation water line 19 for the feed water flow 18 of evaporation water and by a separate evaporation water tank 28, which is fluidically inserted into the feed water flow 18. The evaporation water tank 28 in this case allows evaporation water to flow through and is fluidically arranged between the valve device 23 and the evaporative cooler 13. By way of example, it is provided that a feed valve device 31 is connected downstream of the evaporation water tank 28 with respect to the feed flow direction 17 and communicates fluidically with the evaporation water tank 28 and the evaporative cooler 13. It is used to control or regulate a mass or volumetric flow of the feed water flow 18 of evaporation water flowing out of the evaporation water tank 28 in the direction of the evaporative cooler 13. The feed valve device 31 in this case allows evaporation water to flow through and is fluidically inserted into the feed water flow 18, between the evaporative cooler 13 and the evaporation water tank 28. By way of example, the feed valve device 31 is implemented by a sprinkler valve 42 which controls or regulates the supply of evaporation water into the evaporative cooler 13 in terms of volume or quantity. The evaporation water tank 28, for example, has a tank collection volume 29 of greater than 0 liters/kW and less than or equal to 0.1 liters/kW of installed electrical output of the fuel cell 2.

Figure 4:
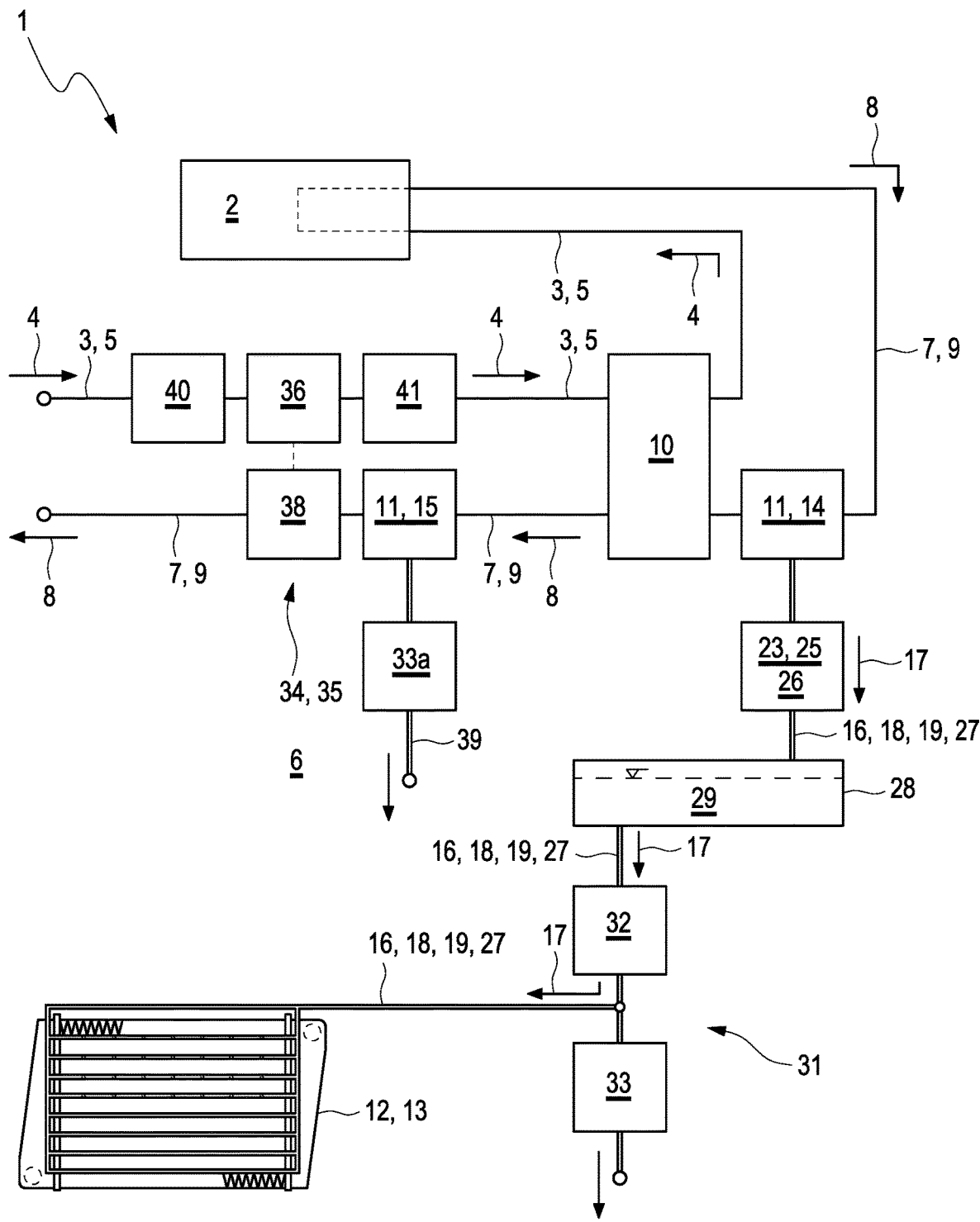

FIG. 4 shows a simplified diagram of a preferred, further exemplary embodiment of a fuel cell device 1. It differs from the previous exemplary embodiment in particular in that the feed valve device 31 is now in several parts and has a conveying device 32 for conveying evaporation water from the evaporation water tank 28 to the evaporative cooler 13 and a further water outlet valve 33 for discharging evaporation water from the evaporation water tank 28. The conveying device 32 is implemented, for example, by a delivery pump, particularly a peripheral wheel pump or a side channel impeller. The water outlet valve 33 is arranged fluidically indirectly on the evaporation water tank 28 via the conveying device 32.

Figure 5:
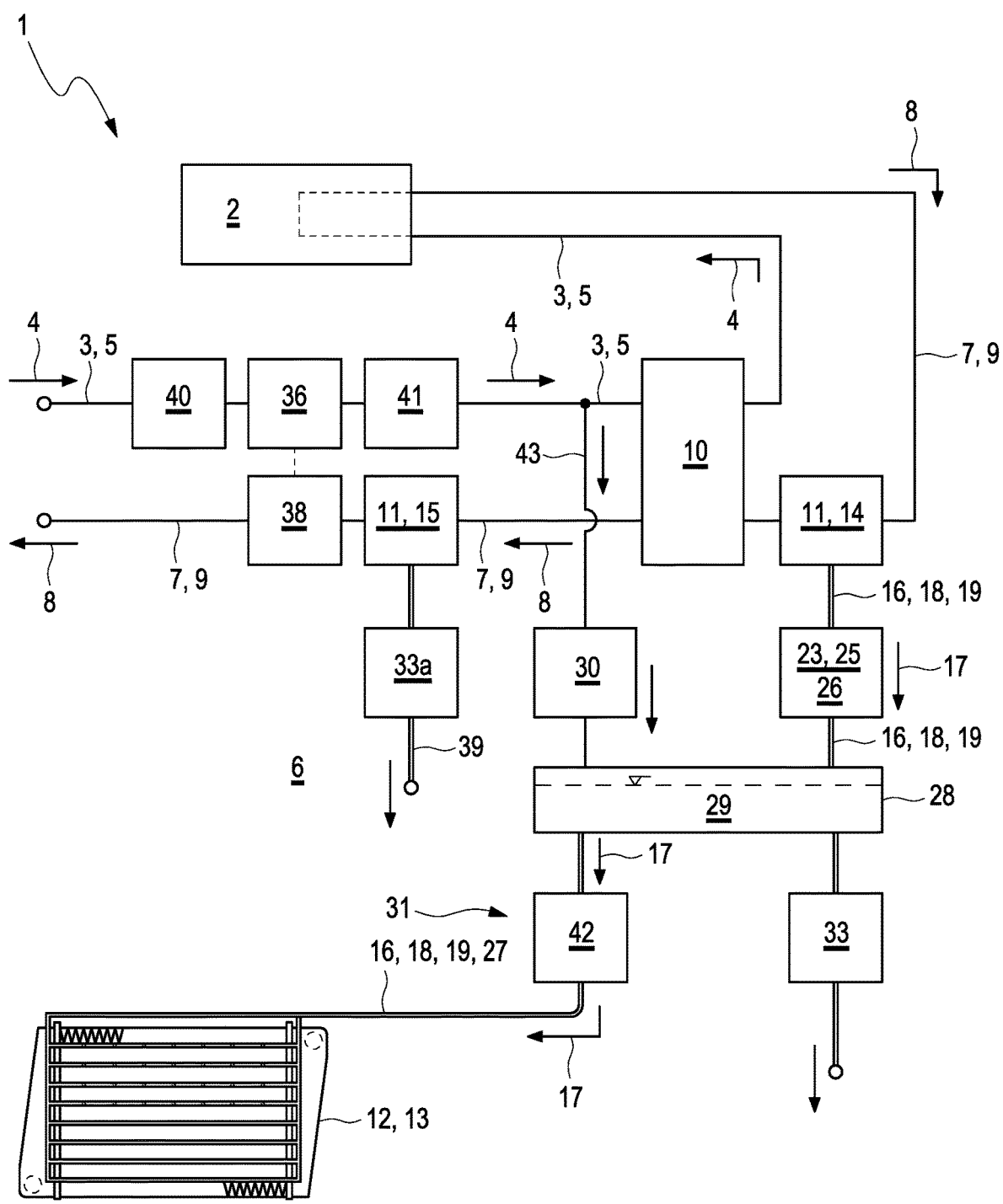

FIG. 5 shows a simplified diagram of a preferred, further exemplary embodiment of a fuel cell device 1. It differs from the previous exemplary embodiment in particular in that the further water outlet valve 33 of the feed valve device 31 for discharging evaporation water from the evaporation water tank 28 is now arranged directly on the evaporation water tank 28 and not via the conveying device 32 and in that the conveying device 32 of the feed valve device 31 is now implemented by a sprinkler valve 42. Furthermore, it is provided according to this exemplary embodiment that the evaporation water tank 28 is pressurized by means of pressurized supply air from the cathode air system, for example from the cathode supply air flow 5. For this purpose, a compressed air line 43 is provided, which opens into the supply air path 3 at one end and into the evaporation water tank 28 at the other end. An air valve 30, which allows air from the cathode supply air flow 5 to flow through, is also inserted into the compressed air line 43, which air valve allows the air flow flowing through the compressed air line 43 to be controlled or regulated, so that the air pressurization of the evaporation water tank 28 can be controlled.

Figure 6:
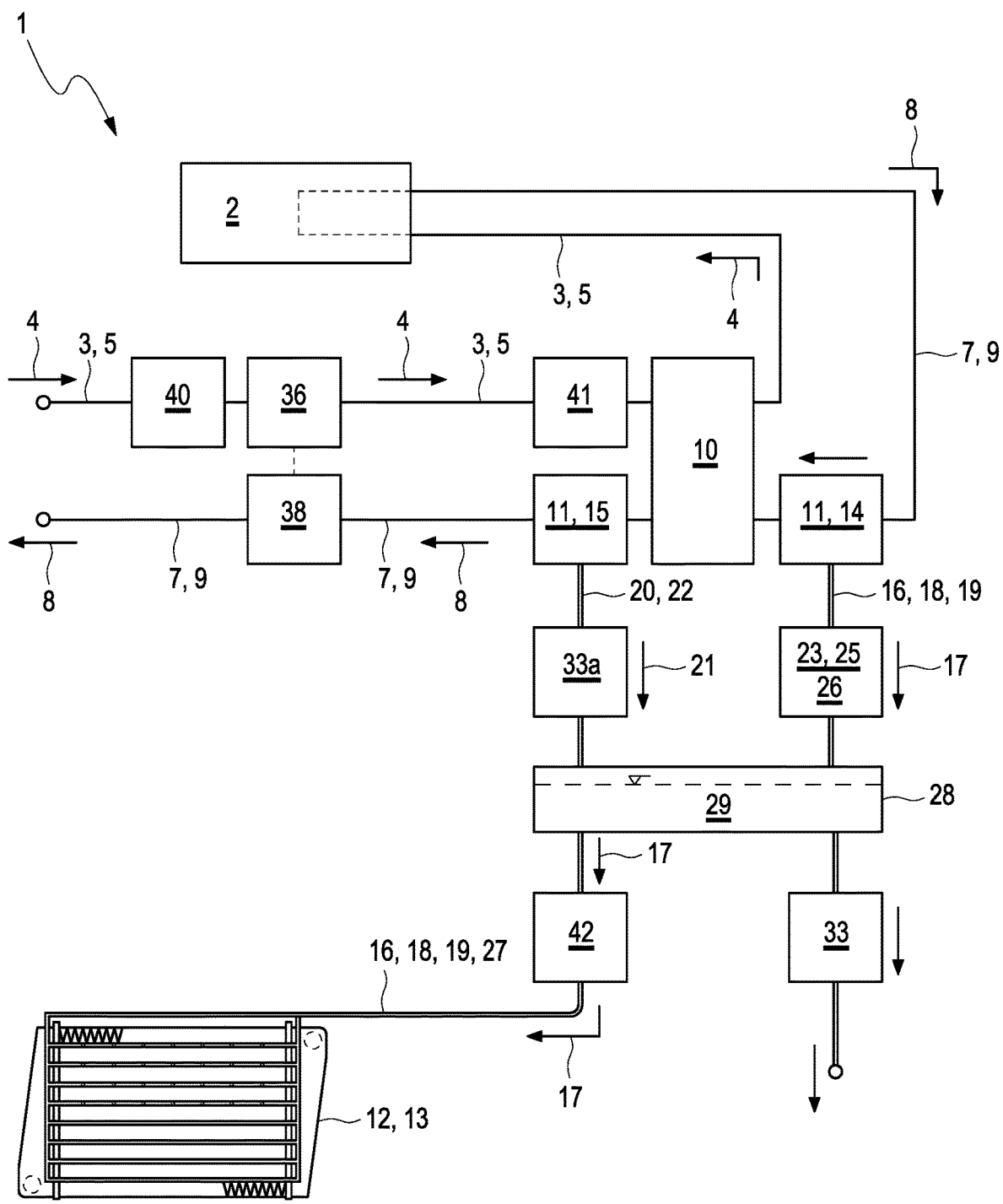

FIG. 6 shows a simplified diagram of a preferred, further exemplary embodiment of a fuel cell device 1. It differs from the previous exemplary embodiment in particular in that evaporation water is provided not only by the coarse water separator 14 on the evaporation water tank 28, but also by the fine water separator 15. As an example of this, a further feed water path 20 for a further feed water flow 22 of evaporation water, which further feed water flow defines a further feed flow direction 21, is provided, which feed water flow leads from the fine water separator 15 to the evaporation water tank 28 via a water feed valve 33a. This means that the evaporation water tank 28 is connected to the coarse water separator 14 and the fine water separator 15 with fluidic communication, so that evaporation water from the exhaust air provided by the coarse water separator 14 and the fine water separator 15 can flow to the evaporation water tank 28 and, from there, can flow to the evaporative cooler 13 either via a sprinkler valve 42 or a conveying device 32, and/or can flow to the environment 6 of the fuel cell device 1 via a further water outlet valve 33. The feed water path 16 and the further feed water path 20 are each routed, for example, through an evaporation water line 19, which fluidically connects the coarse water separator 14 or the fine water separator 15 to the evaporation water tank 28.

Figure 7:
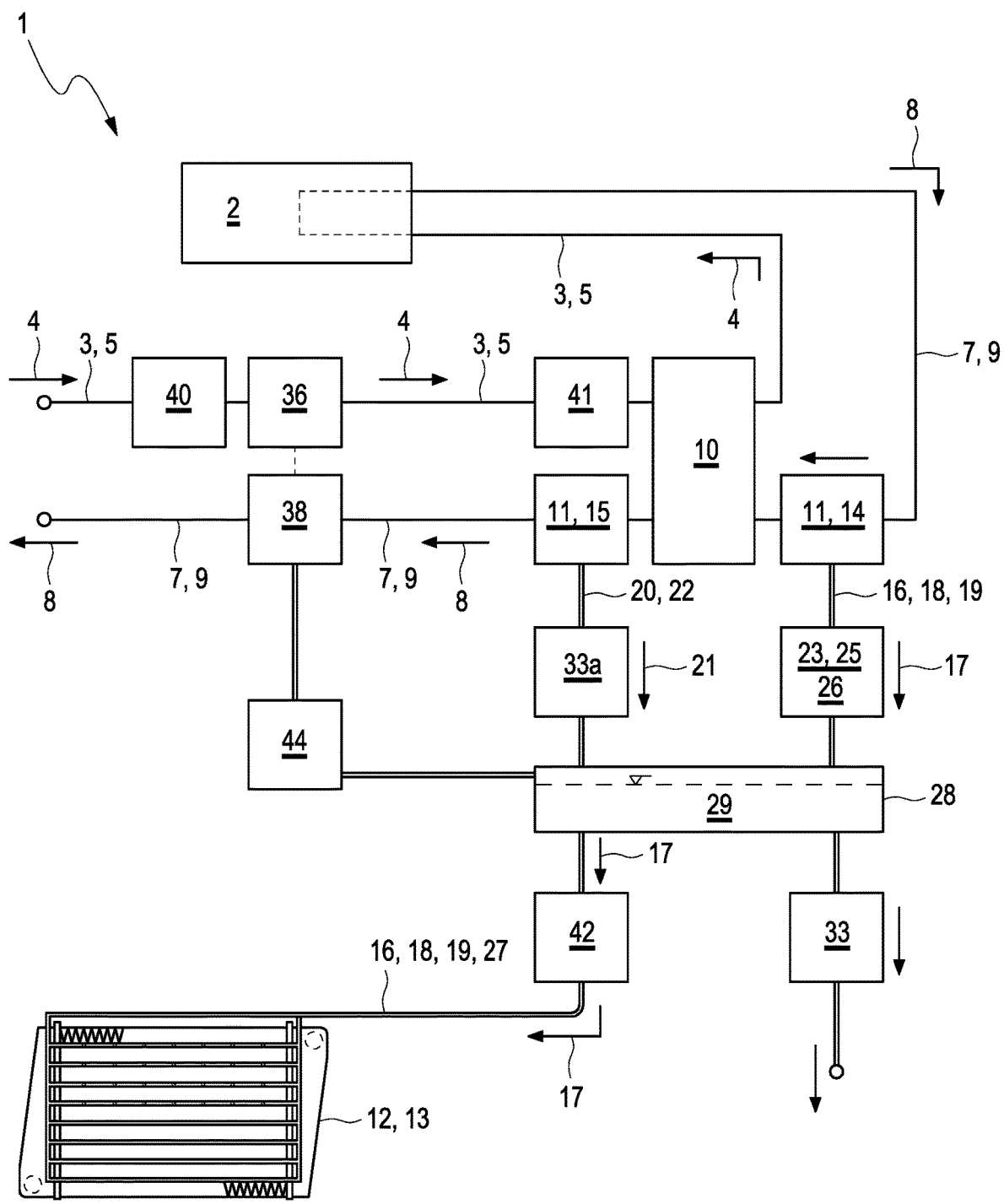

FIG. 7 shows another simplified diagram of a preferred, further exemplary embodiment of a fuel cell device 1. It differs from the exemplary embodiment of FIG. 6 only due to an added extraction point for water at or downstream of the drive turbine 38. The water accumulating at the extraction point can be supplied to the evaporation water tank 28 via a valve, which is illustrated by a small box and labeled with reference numeral 44 in FIG. 7. It is provided, for example, that said evaporation water tank 28 is fluidically connected to the drive turbine 38 via the valve 44. As a result, water can flow from the exhaust air flow 9 of the fuel cell 2 into the evaporation water tank 28 via the valve 44. Particularly when waste heat from the fuel cell 2 is used, a relatively large water quantity can accumulate in or on the drive turbine 38, but this has little or no overpressure with respect to the standard atmosphere. It is particularly advantageous to arrange the evaporation water tank 28 below the drive turbine 38 so that the water obtained can flow into the evaporation water tank 28. Alternatively or additionally, a pump (not shown) can also be used to convey the water into the evaporation water tank 28.

In all of the exemplary embodiments, the evaporation water tank 28 can also be referred to as a water tank 28, or vice versa. In all of the exemplary embodiments, evaporation water can also be referred to as cooling water, or vice versa.

The invention claimed is:

1. A fuel cell device for a motor vehicle, comprising:
a fuel cell, a supply air path leading to the fuel cell for a cathode supply air flow that defines a supply air flow direction, the cathode supply air flow comprising water-containing supply air supplied to the fuel cell; and an exhaust air path leading away from the fuel cell for a cathode exhaust air flow that defines an exhaust air flow direction, the cathode exhaust air flow comprising water-containing exhaust air flowing out of the fuel cell;
the supply air path and the exhaust air path being routed through a humidifier, the humidifier communicates fluidically with a supply air and an exhaust air for humidifying the supply air and dehumidifying the exhaust air;
the exhaust air path being further routed through a water separator, the water separator communicates fluidically with the exhaust air for removing water from the exhaust air and for providing the water as evaporation water;
a heat exchanger for cooling the fuel cell that has an evaporative cooler for cooling the heat exchanger;
wherein the evaporative cooler is assigned to the water separator in fluidic communication and is supplied with evaporation water by the water separator; and
wherein the water separator is arranged upstream of the humidifier with respect to the exhaust air flow direction of the cathode exhaust air flow.

2. The fuel cell device according to claim 1, wherein:
a second water separator is arranged downstream of the humidifier with respect to the exhaust air flow direction of the cathode exhaust air flow.

3. The fuel cell device according to claim 2, wherein at least one of:
the water separator that is arranged upstream of the humidifier is structured as a coarse water separator for removing water from the exhaust air and for providing the water as evaporation water, and
the second water separator that is arranged downstream of the humidifier is structured as a fine water separator for removing water from the exhaust air and for providing the water as evaporation water, the fine water separator configured to remove smaller water particles from the exhaust air compared to the coarse water separator.

4. The fuel cell device according to claim 3, wherein:
a feed water path is provided leading from the water separator to the evaporative cooler for a feed water flow of evaporation water, the feed water flow defines a feed flow direction for supplying the evaporative cooler; or
a pair of fluidically parallel feed water paths are provided for supplying the evaporative cooler, the pair of fluidically parallel feed water paths including:
a feed water path for a feed water flow of evaporation water, the feed water flow defines a feed flow direction, wherein the feed water path leads from the coarse water separator to the evaporative cooler, and
a further feed water path for a further feed water flow of evaporation water, the further feed water flow defines a further feed flow direction, wherein the further feed water path leads from the fine water separator to the evaporative cooler.

5. The fuel cell device according to claim 4, further comprising a valve device for controlling or regulating a mass or volumetric flow of the evaporation water, the valve device permitting evaporation water to flow through, and the valve device is fluidically inserted into the feed water flow or into the further feed water flow or into the feed water flow and the further feed water flow between the evaporative cooler and the water separator.

6. The fuel cell device according to claim 5, wherein the valve device is structured as a water feed valve, a float valve, a pressure relief valve, or a non-return valve.

7. The fuel cell device according to claim 1, further comprising a collection volume for collecting evaporation water, the collection volume fluidically connected to the evaporative cooler on one side and to the water separator on another side of the collection volume.

8. The fuel cell device according to claim 7, wherein the collection volume is delimited by at least one evaporation water line for a feed water flow of evaporation water.

9. The fuel cell device according to claim 7, further comprising:
a separate evaporation water tank for collecting evaporation water that supplements or delimits the collection volume and allows evaporation water to flow through, and the separate evaporation water tank is fluidically inserted into a feed water flow between a coarse water separator and the evaporative cooler, the coarse water separator configured to remove larger water droplets from the exhaust air compared to a fine water separator; or a separate evaporation water tank for collecting evaporation water that supplements or delimits the collection volume and allows evaporation water to flow through, and the separate evaporation water tank is fluidically inserted into a feed water flow between a valve device and the evaporative cooler.

10. The fuel cell device according to claim 9, wherein the separate evaporation water tank has a tank collection volume of greater than 0 liters/kW and less than or equal to 0.1 liters/kW of installed electrical output of the fuel cell.

11. The fuel cell device according to claim 9, wherein the separate evaporation water tank is pressurized via at least one of pressurized supply air from the cathode supply air flow and pressurized exhaust air from the cathode exhaust air flow.

12. The fuel cell device according to claim 9, further comprising an air valve provided for pressurizing the separate evaporation water tank, the air valve connects the cathode supply air flow to the separate evaporation water tank in fluidic communication, such that supply air can flow through the air valve into the separate evaporation water tank and pressurize the separate evaporation water tank.

13. The fuel cell device according to claim 9, further comprising a feed valve device for controlling or regulating a mass or volumetric flow of the evaporation water, the feed valve device allows evaporation water to flow through and is fluidically inserted into the feed water flow between the evaporative cooler and the separate evaporation water tank.

14. The fuel cell device according to claim 13, wherein at least one of:
the feed valve device comprises a sprinkler valve for controlling or regulating the mass or volumetric flow of the evaporation water flowing out of the separate evaporation water tank;
the feed valve device comprises a conveying device for conveying evaporation water from the separate evaporation water tank to the evaporative cooler; and
the feed valve device comprises a water outlet valve to discharge evaporation water from the separate evaporation water tank, wherein the water outlet valve is either fluidically arranged directly at the separate evaporation water tank or is fluidically arranged indirectly at the separate evaporation water tank via a conveying device.

15. The fuel cell device according to claim 14, wherein the conveying device is a delivery pump.

16. The fuel cell device according to claim 1, further comprising:
a compressor system including a compressor operated by exhaust air;
wherein an impeller of the compressor for compressing supply air allows the supply air to flow through and is fluidically inserted into the cathode supply air flow upstream of the fuel cell; and
wherein a drive turbine of the compressor for driving the impeller allows exhaust air to flow through and is fluidically inserted into the cathode exhaust air flow downstream of the humidifier.

17. The fuel cell device according to claim 1, wherein:
the heat exchanger or the evaporative cooler is operated at an ambient temperature of greater than or equal to 5° C.; or the heat exchanger or the evaporative cooler is operated at a coolant temperature from the fuel cell of greater than or equal to 60° C.; or operation of the heat exchanger or of the evaporative cooler is controlled or regulated via a switch-on characteristic, wherein a degree of switch-on $Z_{Verd}$ is based on a quantity of heat $Q_{FC}$ of the fuel cell and an ambient temperature $T_{Amb}$ in ° C. of the fuel cell device approximately according to the following equation:

$$Z_{Verd} = f(Q_{FC}/Q_{max} * 55° C./(75° C. - T_{Amb}))$$

where $f(x) \approx 0$ for $x < 0.5$; or operation of the heat exchanger or of the evaporative cooler is regulated, wherein a regulation takes place via a demand map with or without taking into account a thermal inertia of the fuel cell device; or operation of the heat exchanger or of the evaporative cooler is regulated, wherein a regulation takes place based on the ambient temperature of the fuel cell device or the ambient temperature of the fuel cell device and humidity or a coolant temperature; or operation of the heat exchanger or of the evaporative cooler is regulated, wherein a regulation is at least one of controlled by a thermostatic valve and supported by activation of a fan; or operation of the heat exchanger or of the evaporative cooler is regulated, wherein one or more of the following variables are included in a regulation: level of water in a reservoir, use of a retarder, air conditioning, state of charge and temperature of a battery, driving speed, total weight, terrain topology, and traffic situation.

18. A motor vehicle, comprising a fuel cell device integrated or retrofitted in the motor vehicle, the fuel cell device including:
a fuel cell, a supply air path leading to the fuel cell for a cathode supply air flow that defines a supply air flow direction, the cathode supply air flow comprising water-containing supply air supplied to the fuel cell; and an exhaust air path leading away from the fuel cell for a cathode exhaust air flow that defines an exhaust air flow direction, the cathode exhaust air flow comprising water-containing exhaust air flowing out of the fuel cell;
the supply air path and the exhaust air path being routed through a humidifier, the humidifier communicates fluidically with a supply air and an exhaust air for humidifying the supply air and dehumidifying the exhaust air;
the exhaust air path being further routed through a water separator, the water separator communicates fluidically with the exhaust air for removing water from the exhaust air and for providing the water as evaporation water;
a heat exchanger for cooling the fuel cell that has an evaporative cooler for cooling the heat exchanger;
wherein the evaporative cooler is assigned to the water separator in fluidic communication and is supplied with evaporation water by the water separator; and
wherein the water separator is arranged upstream of the humidifier with respect to the exhaust air flow direction of the cathode exhaust air flow.

19. The motor vehicle according to claim 18, wherein a second water separator is arranged downstream of the humidifier with respect to the exhaust air flow direction of the cathode exhaust air flow.

20. The motor vehicle according to claim 19, wherein the water separator arranged upstream of the humidifier is a coarse water separator, and the second water separator arranged downstream of the humidifier is a fine water separator, the fine water separator configured to remove smaller water droplets compared to the coarse water separator; and wherein the coarse water separator, the humidifier, and the fine water separator are arranged sequentially along the exhaust air path with respect to the exhaust airflow direction of the cathode exhaust air flow.

* * * * *